US008346054B2

(12) United States Patent
Tsuruga

(10) Patent No.: US 8,346,054 B2
(45) Date of Patent: Jan. 1, 2013

(54) RECORDING DEVICE, RECORDING METHOD AND REPRODUCING DEVICE

(75) Inventor: Sadao Tsuruga, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1221 days.

(21) Appl. No.: 12/000,231

(22) Filed: Dec. 11, 2007

(65) Prior Publication Data

US 2008/0145020 A1 Jun. 19, 2008

(30) Foreign Application Priority Data

Dec. 18, 2006 (JP) ................................ 2006-339398

(51) Int. Cl.
*H04N 5/935* (2006.01)

(52) U.S. Cl. ......... 386/220; 386/248; 386/219; 386/200

(58) Field of Classification Search .................... 386/65, 386/314, 326

See application file for complete search history.

(56) References Cited

U.S. PATENT DOCUMENTS 5,231,666 A * 7/1993 Matyas ........................... 705/75
5,699,392 A 12/1997 Dokic
6,011,899 A 1/2000 Ohnishi et al.
6,356,871 B1 * 3/2002 Hemkumar et al. .......... 704/500
6,557,109 B1 4/2003 Sato
6,751,728 B1 * 6/2004 Gunter et al. ................. 713/153
6,947,556 B1 * 9/2005 Matyas et al. .................. 380/29
7,027,718 B1 4/2006 Ohnishi et al.
2005/0021469 A1 * 1/2005 Han ................................ 705/51
2006/0126850 A1 * 6/2006 Dawson et al. ............... 380/284
2006/0140221 A1 6/2006 Yamada et al.
2006/0280483 A1 12/2006 Tsuruga
2007/0263785 A1 * 11/2007 Williams et al. ............. 379/67.1

FOREIGN PATENT DOCUMENTS

EP 1 076 461 A1 2/2001
EP 1 091 583 A1 4/2001
EP 1 286 538 A2 2/2003
EP 1 335 604 A2 8/2003
EP 1 349 397 A2 10/2003
JP 9-204738 8/1997
JP 9-312634 12/1997

(Continued)

OTHER PUBLICATIONS

Japanese Notice of Reasons for Rejection issued in Japanese Patent Application No. JP 2006-339398 dated Nov. 2, 2010.

(Continued)

*Primary Examiner* — Kambiz Zand
*Assistant Examiner* — Imhotep Durham
(74) *Attorney, Agent, or Firm* — McDermott Will & Emery LLP

(57) ABSTRACT

A satisfactory reproduction is still enabled with recorded MPEG2-TS having a jitter or the like. A recording/reproducing device includes: a reading unit that reads data to which a time stamp is added and for which reference information is multiplexed to permit the acquisition side to reproduce a clock; an output controller outputting data as read-out data at a timing depending on time stamp information; a selection unit changing the operation by the output controller; a time stamp deletion unit removing time stamp information; a separation unit separating the data; a detection unit that determines whether the reference information is unauthorized; and a buffer management unit controlling a starting/halting of reading in accordance with the remaining volume of a buffer for temporarily storing data.

16 Claims, 8 Drawing Sheets

FOREIGN PATENT DOCUMENTS

| | | | |
|---|---|---|---|
| JP | 2002-290910 | A | 10/2002 |
| JP | 2003-101962 | A | 4/2003 |
| JP | 2003-284002 | A | 10/2003 |
| JP | 2004-336332 | | 11/2004 |
| JP | 2005-167649 | | 6/2005 |

OTHER PUBLICATIONS

European Search Report issued in European Patent Application No. EP 07254776.3-1247/1936625, dated Oct. 17, 2008.

* cited by examiner

108
CLOCK REPRODUCTION UNIT
1081
CLOCK CONTROLLER
1082
COMPARATOR
1083
SELECTOR
1084
LPF
1085
VCXO
1086
STC COUNTER
TO DECODER 105
TO TIME STAMP ADDING UNIT 110
FROM SEPARATION/ EXTRACTION UNIT 103

TO SELECTOR 102
TO NETWORK INTERFACE UNIT 106
109
FROM FIXED CLOCK
OSCILLATOR 117
COUNTER
1093
TIME STAMP REMOVING UNIT
1091
SELECTOR
1092
TIME STAMP COMPARISON/
OUTPUT CONTROLLER
1094
TIME STAMP
COMPARISON/
OUTPUT UNIT
FROM READING UNIT 111

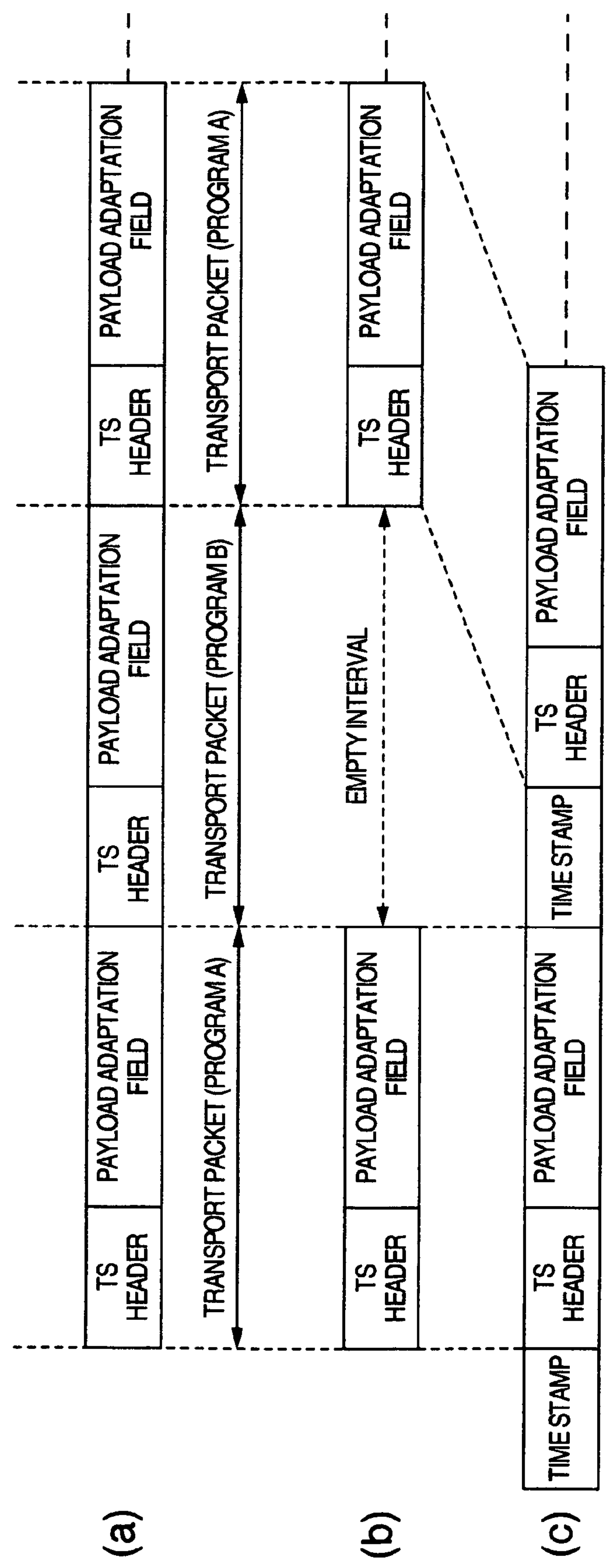
FIG.7
(a)
TS HEADER
PAYLOAD ADAPTATION FIELD
TRANSPORT PACKET (PROGRAM A)
TS HEADER
PAYLOAD ADAPTATION FIELD
TRANSPORT PACKET (PROGRAM B)
TS HEADER
PAYLOAD ADAPTATION FIELD
TRANSPORT PACKET (PROGRAM A)
(b)
TS HEADER
PAYLOAD ADAPTATION FIELD
EMPTY INTERVAL
TS HEADER
PAYLOAD ADAPTATION FIELD
(c)
TIME STAMP
TS HEADER
PAYLOAD ADAPTATION FIELD
TIME STAMP
TS HEADER
PAYLOAD ADAPTATION FIELD

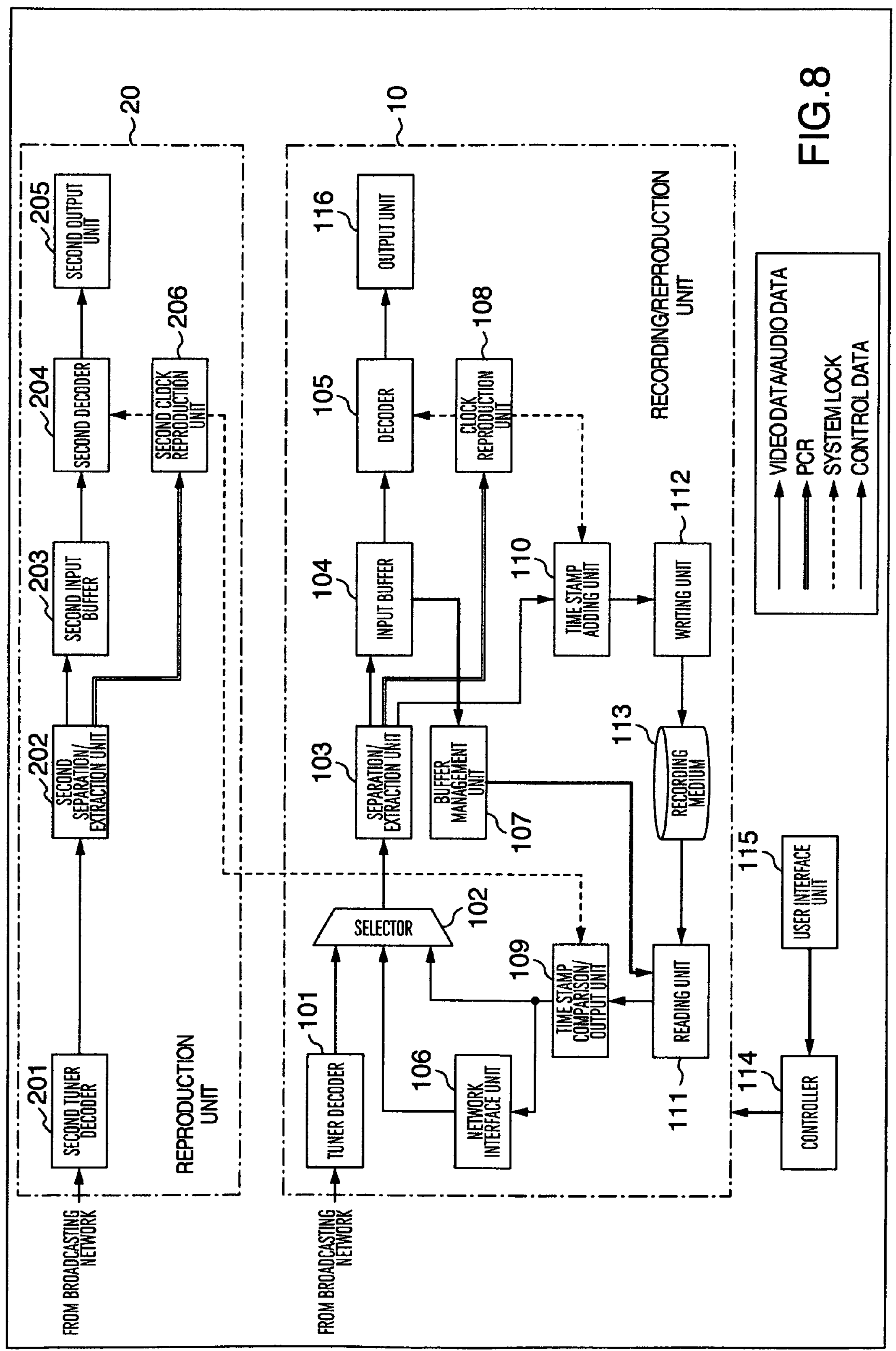

FIG.8
20
205 SECOND OUTPUT UNIT
204 SECOND DECODER
206 SECOND CLOCK REPRODUCTION UNIT
203 SECOND INPUT BUFFER
202 SECOND SEPARATION/ EXTRACTION UNIT
201 SECOND TUNER DECODER
REPRODUCTION UNIT
FROM BROADCASTING NETWORK
10
116 OUTPUT UNIT
105 DECODER
108 CLOCK REPRODUCTION UNIT
RECORDING/REPRODUCTION UNIT
104 INPUT BUFFER
110 TIME STAMP ADDING UNIT
112 WRITING UNIT
103 SEPARATION/ EXTRACTION UNIT
107 BUFFER MANAGEMENT UNIT
113 RECORDING MEDIUM
102 SELECTOR
109 TIME STAMP COMPARISON/ OUTPUT UNIT
111 READING UNIT
101 TUNER DECODER
106 NETWORK INTERFACE UNIT
115 USER INTERFACE UNIT
114 CONTROLLER
FROM BROADCASTING NETWORK
VIDEO DATA/AUDIO DATA
PCR
SYSTEM LOCK
CONTROL DATA

RECORDING DEVICE, RECORDING METHOD AND REPRODUCING DEVICE

BACKGROUND OF THE INVENTION

1. Field of the Invention

The present invention relates to a device and a method for recording and reproducing data included in program content for digital broadcasts.

2. Description of the Related Art

Digital broadcasting, as provided in Japan, North America and Europe, is a configuration wherein video and audio data, encoded in accordance with MPEG2 (Moving Picture Experts Group Phase 2) standards, are multiplexed in accordance with MPEG2-TS (Moving Picture Experts Group Phase 2-Transport Stream) standards. MPEG2-TS recording and reproduction is described, for example, in Japanese Patent Application Laid-Open No. 2004-336332, No. 2005-167649 and No. 9-312634.

According to the description given in Japanese Patent Application Laid-Open No. 2004-336332, the objective is "to provide the digital broadcast receiver that, without causing an underflow or an overflow of the buffer of the digital broadcast receiver, enables normal AV reproduction or double-speed special AV reproduction from a storage device wherein stored are MPEG2-TS data to which a time stamp has been added", and the means for achieving this objective is "the digital broadcast receiver comprising buffer remaining volume monitoring means, for controlling starting and halting of reading by the data reading means in accordance with the volume of the data remaining in the buffer after a video or audio transport stream has been multiplexed, wherein, at the time of normal AV reproduction, the switching means controls output time, and the output time control means adjusts the output time equal to the time for a broadcast wave for performing AV reproduction, and wherein, at the time of special AV reproduction, such as double-speed reproduction, the switching means does not control output time, and the buffer remaining volume monitoring means monitors the buffer volume and controls the starting and halting of reading by the data reading means".

Also, according to the description given in Japanese Patent Application Laid-Open No. 2004-336332, "when normal AV reproduction is to be performed by reading MPEG2-TS data stored in the storage device, synchronous reproduction using PCR is enabled, and since reproduction is performed by synchronizing 27 MHz clocks on a transmission side and a reception side, the underflow or the overflow of an AV buffer unit 206 does not occur".

According to the description given in Japanese Patent Application Laid-Open No. 2005-167649, the problem with the invention is that "since MPEG2-TS is formed by multiplexing a transport packet that includes received video data, in MPEG2-TS, transport packets for an arbitrary channel are contiguously arranged at intervals, and at these empty intervals, transport packets for one or a plurality of different channels are present. Therefore, an appropriate control is required only when the arbitrary transport packets in the MPEG2-TS are to be extracted from the MPEG2-TS and recorded on a hard disk, or displayed on a screen, and how the control should be exercised is a problem". Further, means for resolving this problem is "a storage/output device, according to this invention, comprising acquisition means, for obtaining each of a plurality of contiguous data sets, writing means, for adding, to each of the obtained data sets, a special time stamp that represents information related to the temporal position of the data, and then storing the special time stamp in the storage means, reading means, for reading from the storage means each set of the plurality of stamped data, which are data to which the special time stamp has been added, and for outputting, as read-out data, the individual stamped data that have been read, or stamp-free data obtained by removing the special time stamp from the stamped data; and acquisition and output means, for obtaining and outputting the read-out data that are output by the reading means, wherein the reading means selectively performs the output of the read-out data at the time that does not depend on the special time stamp added to the individual stamped data that has been read and the output of the read-out data at the time that depends on the special time stamp added to the individual stamped data that has been read".

In addition, as described in Japanese Patent Application Laid-Open No. 2005-167649, "the decoder 4 performs flow control, e.g., controls the reading unit 12 by transmitting a request signal to the reading unit 12, and permits the reading unit 12 to output, at an arbitrary timing (i.e., a timing consonant with the frequency of a clock signal oscillating without any control), a plurality of data sets that are obtained by reading from the storage medium 13. For example, when the buffer 85 is vacant (or the quantity of accumulated second selected packets is small), the decoder 4 performs flow control, and obtains a plurality of packets read at the arbitrary timing. It should be noted that during the flow control process the decoder 4 manages the buffer 85. For example, to perform flow control, the decoder 4 maintains the quantity (e.g., eighty percent of the buffer 85) of second selected packets stored in the buffer 85 so that it is larger than the quantity (e.g., twenty percent of the capacity of the buffer 85) when the real time display or the special time stamp control is performed. The data stored in the buffer 85 are erased by the decoder 4 or the controller 71 when the control process is switched between the flow control and the real time display or the special time stamp control."

According to the description given in Japanese Patent Application Laid-Open No. 9-312634, the objective is "a system clock reproduction device having a configuration, provided at a low cost, that prevents unauthorized system clock reproduction that causes a PCR reception abnormality". And the means for achieving this objective is "the fixed value generation device 2140 calculates and holds the convergent value of the control voltage for the VCXO 1140 at the normal PCR reception time, and when the PCR abnormality detection device 2100 detects a PCR reception abnormality, the control voltage of the VCXO 1140 is immediately changed to the output of the fixed value generation device 2140, and normal system clock reproduction is continued."

However, the following problems are not disclosed in the technical ideas presented in Japanese Patent Application Laid-Open No. 2004-336332, No. 2005-167649 and No. 9-312634.

In Japanese Patent Application Laid-Open No. 2004-336332, it is assumed that during the normal reproduction process, the recording/reproducing device generates a system clock based on the same PCR as that used to receive and view digital broadcasting. The PCR is reference information for reproducing a clock that is synchronized (simply clock timing need be matched, even when a phase is shifted) with a system clock that was used to generate a program or content, and in Japanese, the PCR may be referred to as a reference value for the program time standard. In other words, the PCR is reference information for synchronizing a system clock used for encoding with a system clock used for decoding. The PCR can also be referred to as reference information used for correcting a system clock. Assume that normal reproduction is to be performed for MPEG2-TS, for which an abnormality is present in the PCR, e.g., the PCR is discontinuous or the PCR includes a large jitter (a shift in the time axial direction or a fluctuation in a delay time: When an electric signal is to be transmitted, for example, the delay time is extended or reduced due to the characteristic of the transmission path or the external environment, and the signal transmission period is shifted slightly. This shift in the time-axial direction is called a jitter). In this case, a system clock determined by the MPEG standards might not be stably generated. Example causes for the generation of a large jitter in the PCR can be: a defect in a device on a broadcast station side (a broadcasting accident); a defect in means for generating a time stamp to be added during recording; a defect in means that controls a reproduction timing based on a time stamp; and a delay and fluctuation of data broadcast via a network. Further, example causes of the PCR becoming discontinuous can be: omitting part of packets during editing of program content by deleting a part, or because of a reception failure that occurred during the recording of digital broadcasting. It should be noted that, according to the embodiment of the present invention, a time stamp represents the timing for outputting content data to a buffer that will be described later, and that is to be added to content data when the content data are recorded on a recording medium. This time stamp differs from a time stamp such as a DTS (Decoding Time Stamp) or a PTS (Presentation Time Stamp) that is included in advance in a transport packet.

Further, it is thought that various makers produce and sell various digital broadcasting recording devices. There is a case wherein, as a common standard for the makers, adding a time stamp is defined for recording content; however, this accuracy varies. Then, when the MPEG2-TS content that conforms to the common standards is reproduced from the recording device based on the time stamp, the accuracy of the PCR that is handled between the digital broadcasting recording devices might be different. In this state, assume that content is recorded on a recording medium by a device that does not add a time stamp, or by a device that adds a comparatively low accuracy time stamp to recording content, and another device is employed to reproduce this recording medium. In this case, since the time stamp is not normal for the reproduction device, i.e., the time stamp is not present or the accuracy of the time stamp is comparatively low, accordingly, the PCR reproduced based on the time stamp is abnormal, and a stable system clock can not be generated.

When a stable system clock can not be generated due to the above described factor, it is believed that an overflow or an underflow will occur at the buffer (STD buffer) located at the front stage of the decoder. Then, an image might be deteriorated, e.g., a block noise would occur in a picture output by the decoder, or the video output by the decoder would be frozen.

When, even if an overflow or an underflow does not occur in the buffer, a stable system clock can not be controlled within the range that is guaranteed relative to the allowable deviation of the color frequency for an image, the correct color might not be reproduced (displayed).

That is, when a stable system clock can not be generated, a problem arises in that video data and/or audio data included in program data and content data can not be correctly recorded, or reproduced.

Furthermore, as another problem, even when a stable fixed clock not related to a PCR and generated by a quartz oscillator is employed for the reproduction of content to which an abnormal time stamp is added, video data and/or audio data included in program data and content data can not be correctly reproduced.

According to Japanese Patent Application Laid-Open No. 2005-167649, when a packet recorded on a recording medium is to be read to a buffer for decoding, an arbitrary timing that is not related to a PCR is employed in consonance with the quantity of packets stored in the buffer. Therefore, the content data can be somewhat correctly reproduced, regardless of the presence or absence and the level of accuracy of the time stamp. However, the reproduced content may be shifted away from a system clock that was being employed when the content was prepared.

In Japanese Patent Application Laid-Open No. 9-312634, the prevention of unauthorized system clock reproduction that occurs at the time of a PCR reception abnormality is described. However, no consideration is given to a problem that occurs when content is recorded on a recording medium. In addition, no consideration is given to a problem that occurs when a different device is employed to reproduce content recorded on a recording medium, and an abnormal PCR or time stamp has been added to the content. As a result, normal reproduction of the content might not be possible.

These problems are encountered not only with MPEG2, but also with other standards, such as H.264.

SUMMARY OF THE INVENTION

To resolve these problems, according to one objective of the present invention, whether or not a PCR falls with in a predetermined condition is determined, and when the PCR falls within the predetermined condition, reproduction is performed based on a time stamp. Otherwise, should the PCR fall outside the predetermined condition, the intended reproduction method is abandoned and another method is used. Further, for example, whether or not a PCR falls within a predetermined condition is determined, and when the PCR falls within the predetermined condition, recording is performed using a system clock based on the PCR. In this case also, should the PCR fall outside the predetermined condition, the intended recording method is changed and another method is used.

Specifically, according to the present invention, a reproducing device comprises:

a reading unit, for reading from a recording medium, based on a time stamp representing a timing for reading from a recording medium, a digital signal that includes content data, a program time standard reference value, used for correction of a system clock, and the time stamp;

a decoder, for decoding the content data included in the digital signal read by the reading unit; and a controller, for permitting the reading unit, when the program time standard reference value falls outside a predetermined condition, to change from the reading of a digital signal that is based on the use of a time stamp, to the reading of a digital signal that is not based on use of a time stamp. Further, a recording device comprises:

a receiver, for receiving a digital signal that includes content data and a program time standard reference value for correcting a system clock;

a clock reproduction unit, for generating a corrected system clock using the program time standard reference value included in the digital signal received by the receiver;

a time stamp adding unit, for employing the system clock, generated by the clock reproduction unit, to add to the digital signal received by the receiver a time stamp representing a timing at which to perform reading from a recording medium;

a recording unit, for recording on a recording medium the digital signal for which the time stamp has been provided by the time stamp adding unit; and a controller, for when the program time standard reference value falls outside a predetermined condition, permitting the clock reproduction unit to generate a system clock without using the program time standard reference value that is outside the predetermined condition.

According to these arrangements, images having less deterioration can be reproduced. And MPEG2-TS especially, when recorded using a different recording device, can be appropriately reproduced.

Other objectives, means and advantages will be described in the following description of the embodiments.

BRIEF DESCRIPTION OF THE DRAWINGS

FIG. 7 is a diagram showing an example data structure for a TS packet employed by the digital broadcast reception device; and FIG. 8 is a block diagram illustrating a digital broadcast reception device, according to a second embodiment of the present invention, on which a recording/reproduction device is mounted.

DETAILED DESCRIPTION OF THE EMBODIMENTS

According to the preferred embodiments of the present invention, the recording of content using the MPEG2 form and the reproduction thereof are employed as an example. However, the present invention is not limited to the technique related to MPEG2, and can be applied for the other standards, such as H.264. Furthermore, in the embodiments, content is defined as programs to be transmitted by broadcast stations, and as programs and films recorded using a different recording device. However, the content is not limited to these, and may also include video data and audio data. Further, digital broadcasting in the embodiments includes not only digital broadcasting using groundwave, broadcast satellites and communication cables, but also digital broadcasting using other communication networks, such as the IP (Internet Protocol) network.

First Embodiment

(1) Overview

An overview of content reproduction by a recording/reproducing device, for a first embodiment of the present invention, will now be described.

For the reproduction of content recorded on a recording medium using the MPEG2-TS form, the recording/reproducing device of this embodiment generally employs a clock generated by a fixed clock oscillator, such as a quartz oscillator, a system clock generated based on a PCR and a time stamp.

Figure 5:
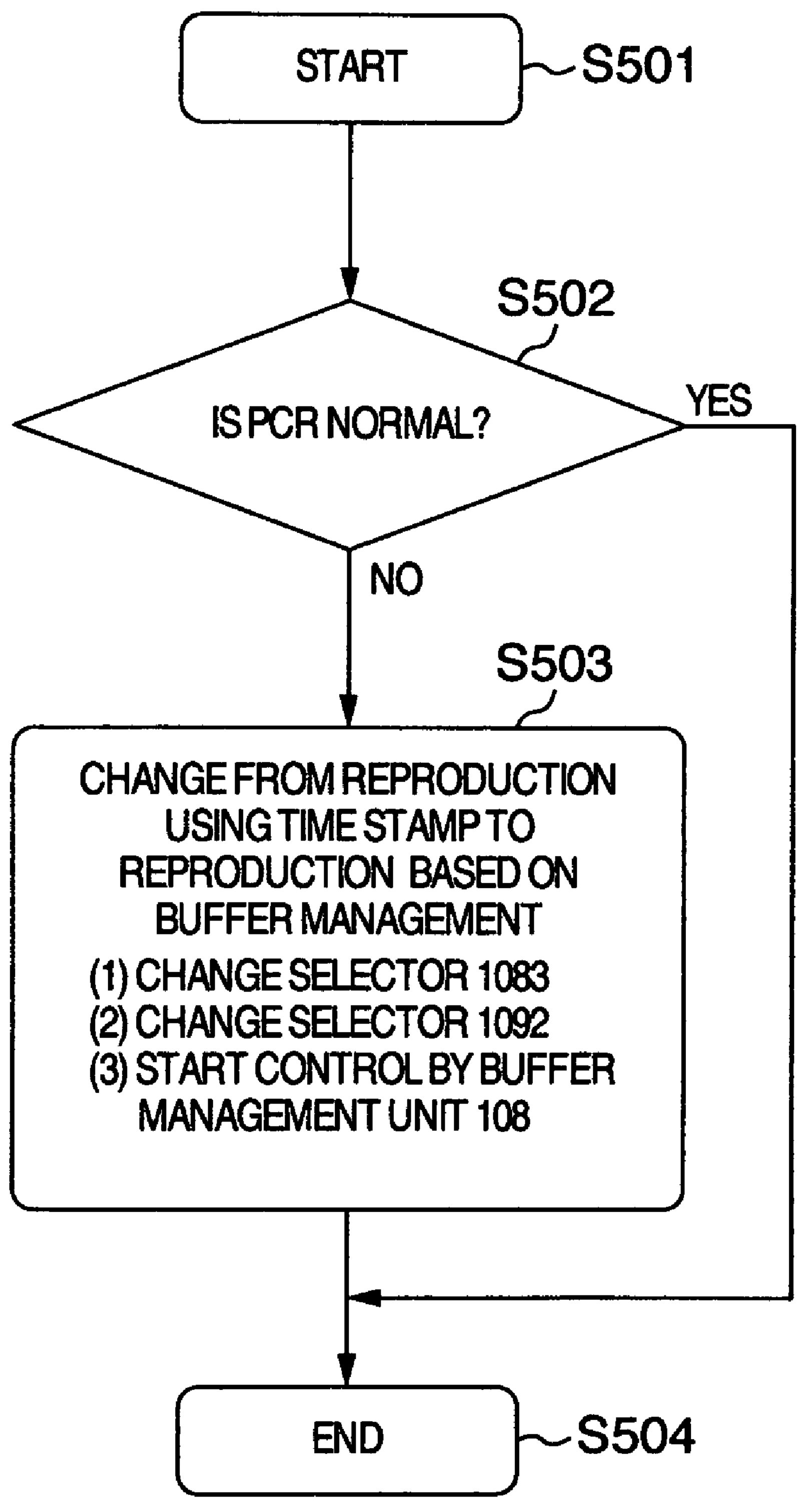
FIG. 5 is a flowchart showing an example operation (1) of a controller.

The reproduction processing will be described while referring to the flowchart in FIG. 5. In the content reproduction processing, at step (simply denoted by “S” in FIG. 5; and hereinafter, also in the specification, a step is referred to simply as “S”) 502, a check is performed to determine whether the PCR for the pertinent content is normal. When the PCR is normal, program control is shifted to S504, and the processing in FIG. 5 is terminated. That is, the content is reproduced using the time stamp.

When it is determined at S504 that the PCR is not normal (is abnormal), program control advances to S503. At S503, which will be described later in detail, reproduction using the time stamp is changed to reproduction based on the management of a buffer.

This is because when the PCR is abnormal the time stamp may also be abnormal, and the content data are not be transmitted from the recording device to the buffer at an arbitrary timing, so that an overflow or an underflow may occur in the buffer. When reproduction is performed based on buffer management that does not require comparison of the time stamps, video fluctuation or video freeze due to an overflow or an underflow of the buffer can be prevented. That is, when the PCR is normal, reproduction based on a time stamp is performed, or when the PCR is abnormal, the process is changed to reproduction based on buffer management. Since a reproducing method that uses the time stamp is employed when the PCR is normal, and a replacement reproducing method (e.g., reproduction based on buffer management) is employed when the PCR is abnormal, images and/or sounds can be reproduced that are less deteriorated.

An overview of content recording by the recording/reproducing device of this embodiment will now be presented. For the recording of content in MPEG2-TS, the recording/reproducing device of this embodiment generally employs a system clock generated based on a PCR and a time stamp.

The recording processing will be further described while referring to the flowchart in FIG. 5. During the content recording processing, at S502, a check is performed to determine whether the PCR of the pertinent content is normal. When the PCR is normal, program control is shifted to S504, and the processing in FIG. 5 is terminated. That is, the content is recorded using the time stamp.

When it is determined at S502 that the PCR is not normal (is abnormal), program control advances to S503. At S503, which will be described later in detail, generation of a system clock based on the PCR is changed to generation of a system clock based on clock control information that will be described later. Then, the recording of content is performed using a system clock that is generated based on the clock control information.

This is done because when the PCR is abnormal a normal system clock may not be generated, and the content would not be correctly recorded. That is, when the PCR is normal, recording is performed using a system clock generated based on the PCR, but when the PCR is abnormal, the process is changed to recording performed using a system clock that is generated based on clock control information. Since when the PCR is normal a system clock based on the PCR is employed for recording, and since when the PCR is abnormal a replacement method (e.g., generation of a system clock using clock control information) is employed, the content can be recorded more correctly.

(2) Details

This embodiment will now be described in detail.

Figure 1:
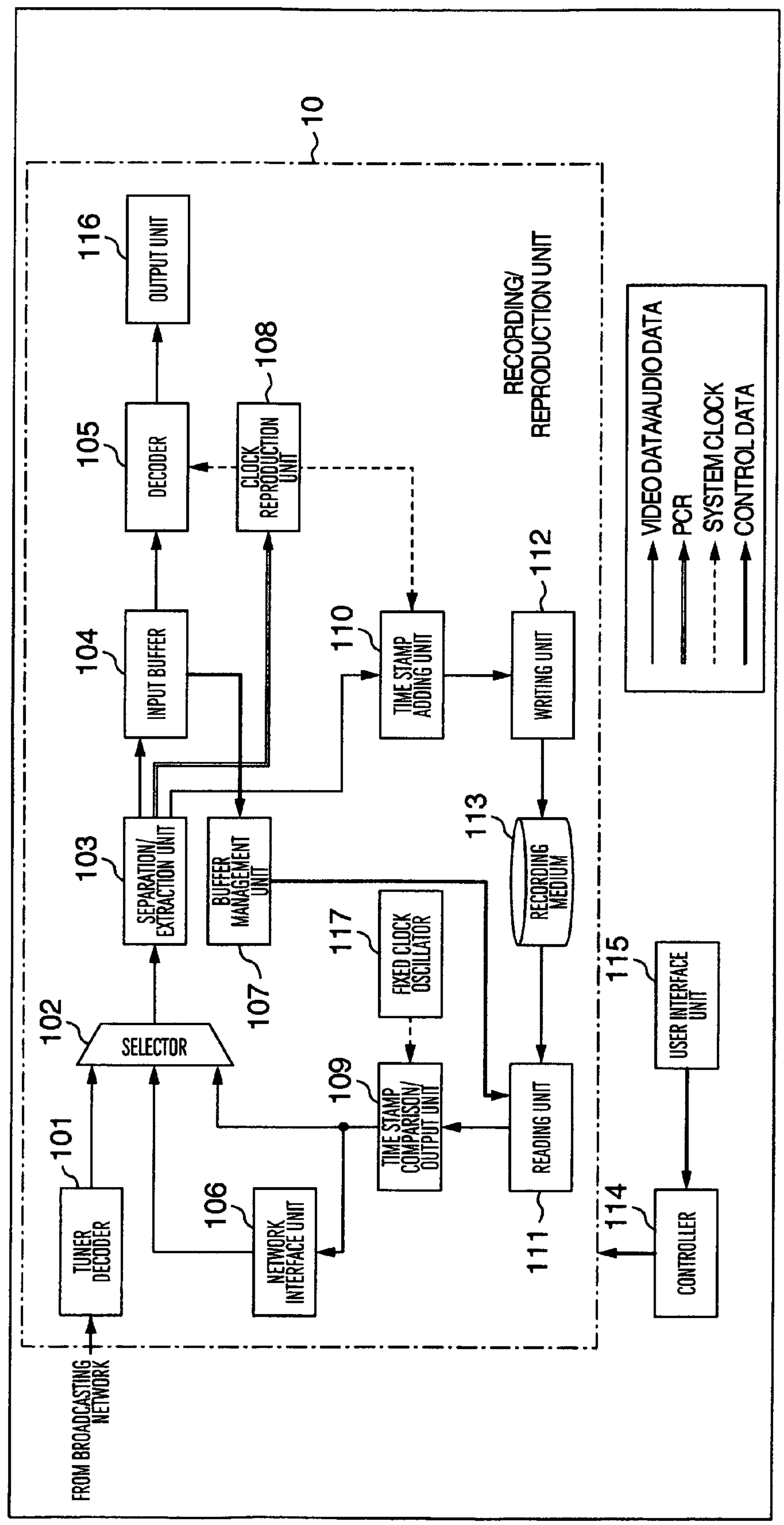
FIG. 1 is a block diagram illustrating a digital broadcast reception device, according to a first embodiment of the present invention, on which a recording/reproduction device is mounted.

FIG. 1 is a diagram illustrating an example configuration of a digital broadcast reception device that serves as the recording/reproducing device of the embodiment for receiving a digital broadcast. This configuration is provided using hardware; however, software may be employed to provide part of the configuration. Furthermore, this configuration may also be applied for services such as a VOD (Video On Demand), for the transmission of video content and audio content to specific users. Generally, these services are also called distributions.

In FIG. 1, the digital broadcast reception device includes a recording/reproduction unit 10, a controller (e.g., a CPU (Central Processing Unit)) 114 and a user interface (e.g., an input device, such as a keyboard, a mouse or a remote controller) 115.

The controller 114 is connected by a bus to the individual sections (including the recording/reproduction unit 10) of the digital broadcast reception device, and controls the operation of the entire digital broadcast reception device. Further, the controller 114 receives various instruction signals from a user via the remote controller of the user interface unit 115, and based on the instruction signals, controls the individual sections, connected via the bus, to perform various processes.

The recording/reproduction unit 10 includes the following arrangement: a tuner decoder 101, a selector 102, a separation/extraction unit (e.g., a demultiplexer) 103, an input buffer 104, a decoder (e.g., an MPEG decoder) 105, a network interface unit 106, a buffer management unit 107, a clock reproduction unit 108, a time stamp comparison/output unit 109, a time stamp adding unit 110, a reading unit 111, a writing unit 112, a recording medium (e.g., a hard disk, a memory, an optical disk or a magneto-optical disk) 113, an output unit (e.g., a display unit employing a CRT (Cathode Ray Tube), an LCD (Liquid Crystal Display) or a PDP (Plasma Display Panel), an audio output unit that uses loudspeakers, or an output terminal for outputting video data and/or audio data to another display device 116, and a fixed clock oscillator 117, such as a quartz oscillator.

It should be noted that at locations where lines indicating the transmission of information and of a PCR simply intersect, the lines do not contact each other. However, actual line contact is represented by a solid circle, and lines branch at that point (the same convention is employed for FIGS. 2 to 8).

The tuner decoder 101 receives a digital broadcast signal from a broadcast station via a broadcasting network, such as is provided by a broadcast satellite, a groundwave or a communication cable. Further, the tuner decoder 101 performs a channel tuning or a detection process for the frequency of a physical or virtual channel that is designated via the user console unit of the remote controller of the user interface unit 115 and via the controller 114. Then, the tuner decoder 101 outputs, to the selector 102, MPEG2-TS for which digital demodulation and error correction have been performed.

The selector 102 performs three-input and one-output selection in accordance with control exercised by the controller 114, and outputs the result to the separation/extraction unit 103.

The separation/extraction unit 103 separates and extracts, from received MPEG2-TS, a transport packet for a channel (program) that is designated via the user console unit of the remote controller of the user interface unit 115 and via the controller 114, and outputs the obtained transport packet to the time stamp adding unit 110. Furthermore, the separation/extraction unit 103 separates/extracts a video and an audio PES (Packetized Elementary Stream) or ES (elementary Stream) from a transport packet for a channel (program) that is designated via the user console unit of the remote controller of the user interface unit 115 and via the controller 114, and outputs the obtained elementary stream to the input buffer 104. ES represents encoded image and audio data, and PES represents packet data obtained by dividing image ES or audio ES into appropriate sizes. The separation/extraction unit 103 also extracts a PCR (Program Clock Reference) from a transport packet for a channel (program) that is designated via the user console unit of the remote controller of the user interface unit 115 and via the controller 114, and outputs the extracted PCR to the clock reproduction unit 108.

The input buffer 104 is used to temporarily store a video and/or an audio PES or ES received from the separation/extraction unit 103. The decoder 105 compares a DTS and/or a PTS, which corresponds to a PES or an ES stored in the input buffer 104, with an STC (System Time Clock) count value received from the clock reproduction unit 108, which will be described later, and obtains a decoding/display timing. Using this timing, the decoder 105 extracts and decodes the video and/or the audio PES or ES stored in the input buffer 104, and outputs the decoded video and/or audio data to the output unit 116.

The output unit 116 employs the display unit and/or the audio output unit, which serves as an output device, to reproduce decoded video and/or audio data. Or, the output unit 116 outputs content data, for example, to another display device via an output terminal.

The clock reproduction unit 108 employs a PCR to regenerate, for example, the system clock of a receiver, for which the frequency matches the system clock of the encoding/multiplexing unit of a broadcasting station. The thus generated system clock is output to an STC counter provided inside the clock reproduction unit 108 and the time stamp adding unit 110. Further, the STC count value of the STC counter to be operated based on the regenerated system clock is output to the decoder 105. This process will be described later while referring to FIG. 2.

The time stamp adding unit 110 generates a time stamp in accordance, for example, with a counter that is to be operated based on the system clock reproduced by the clock reproduction unit 108, adds the time stamp to (or embeds it in) a transport packet that is separated or extracted by the separation/extraction unit 103, and outputs the transport packet to the writing unit 112. This process will be described later while referring to FIG. 3.

The writing unit 112 records, on the recording medium 113, a transport packet to which a time stamp has been added by the time stamp adding unit 110. As a result, one stream consisting of transport packets, which include video and/or audio data for a specific channel (i.e., specific program content or downloaded content) and to which a plurality of time stamps have been added, is recorded on the recording medium 113 as a single data file, or as two or more data file segments obtained by dividing the data file.

A time stamp can also be defined as time information related to the temporal location of a transport packet to which the stamp is to be added. For example, the time stamp can indicate the time at which the transport packet transmitted by the separation/extraction unit 103 was entered in the time stamp adding unit 110, or a temporal difference from a specific transport packet used as a reference (as an example, the transport packet immediately before or the first transport packet). As described above, this time stamp differs from a time stamp, such as a DTS or a PTS, that is included in advance in a transport packet.

The buffer management unit 107 monitors the quantity of transport packets in the input buffer 104 that have not been processed by the decoder 105, and in accordance with the quantity, controls the reading starting and halting for the reading unit 111. The quantity of transport packets that have not been processed by the decoder 105 is also called a buffer volume. In this control process, for example, two threshold values are provided for the quantity in the input buffer 104, and when the buffer volume of the input buffer 104 becomes equal to or greater than the first threshold value, the reading performed by the reading unit 111 is halted. When the buffer volume of the input buffer 104 becomes equal to or lower than the second threshold value, starting the reading is permitted. Furthermore, the first and second threshold values may be near the maximum value for the buffer capacity and near the zero value, respectively, and appropriate values, such that an overflow and an underflow do not occur in the input buffer 104, should be set. When the time stamp and the PCR are normal, the monitoring of the quantity of transport packets in the input buffer 104 that have not been processed by the decoder 105, and the controlling of the reading unit 111 may not be performed.

The reading unit 111 that is controlled via the buffer management unit 107 or the controller 114 sequentially reads, from the recording medium 113, transport packets that are included in a stream and to which a plurality of time stamps have been added, and outputs the transport packets to the time stamp comparison/output unit 109.

The time stamp comparison/output unit 109 compares, with the count value of the counter that is operated based on a clock produced by the fixed clock oscillator 117, such as a quartz oscillator, the time stamp for the transport packet, which is read by the reading unit 111 and to which the time stamp has been added. When the time stamp and the count value match, the time stamp is deleted (removed) from the transport packet, and the transport packet is output to the selector 102 and the IEEE1394/network interface unit 106. Or, depending on a condition that will be described later, the time stamp comparison/output unit 109 does not compare the counter value with the time stamp that has been added to the transport packet that is read by the reading unit 111, deletes (removes) the time stamp directly from the transport packet, and outputs the resultant transport packet to the selector 102 and the network interface unit 106. The time stamp comparison/output unit 109 will also be described later while referring to FIG. 4.

The network interface unit 106 is connected via a line (via a IEEE1394 cable or a LAN cable or by radio) to different devices, such as a recorder and a display device, that are an output destination and an input source. The network interface unit 106 receives video and/or audio transport packets, from which the time stamps have been deleted by the time stamp comparison/output unit 109, converts the transport packets into forms that conform to respective transmission standards, and outputs the obtained transport packets to the different devices that are the output destinations. Furthermore, the network interface unit 106 receives, via the line from the different device that is an input source, video and/or audio data that conforms to its own transmission standard, converts the data into a transport packet, and outputs the transport packet to the selector 102. A plurality of network interface units 106 may be provided.

In this embodiment, counters are provided for the clock reproduction unit 108, the time stamp comparison/output unit 109 and the time stamp adding unit 110. However, counters need not always be arranged. For example, counters can be located in the clock generation sections, such as the clock reproduction unit 108 and the fixed clock oscillator 117, where a clock and a count value held by the counter can be transmitted to a section such as time stamp comparison/output unit 109 and to the time stamp adding unit 110 that employs a counter value. Then, counters are not required for the time stamp comparison/output unit 109 and the time stamp adding unit 110. Further, a counter may be provided separately, and a count value may be transmitted from the counter to a section that needs a count value.

The arrangement and the operation of the clock reproduction unit 108 will now be described in detail while referring to FIG. 2.

Figure 2:
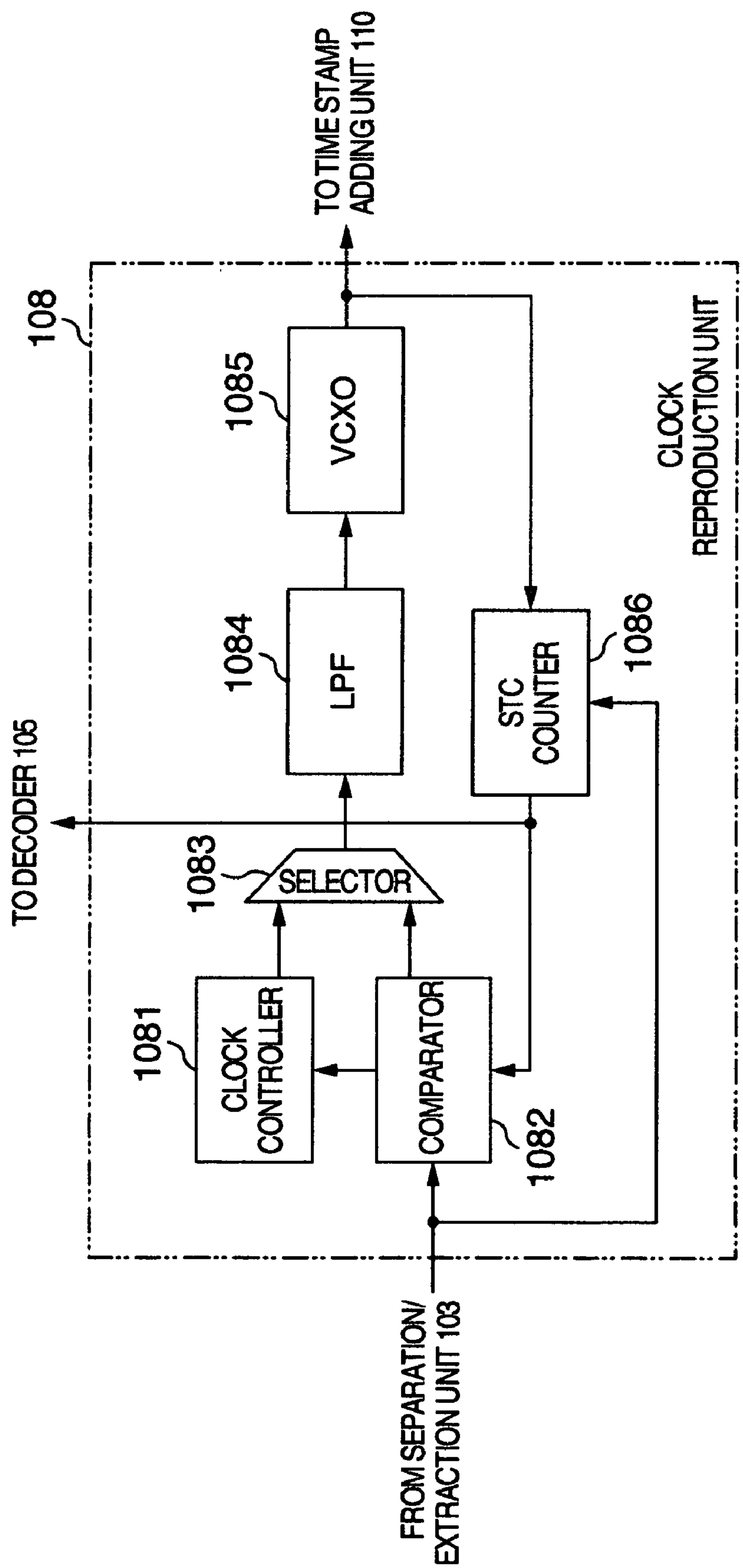
FIG. 2 is a block diagram illustrating an example arrangement of a clock reproduction unit.

While referring to FIG. 2, the clock reproduction unit 108 includes a clock controller 1081, a comparator 1082, a selector 1083, an LPF (Low Pass Filter) 1084, a VCXO (Voltage Controlled Crystal Oscillator) 1085 and an STC counter 1086.

The PCR, which is separated and extracted by the separation/extraction unit 103 in FIG. 1, is transmitted to the comparator 1082 and the STC counter 1086.

Upon receiving the PCR, the comparator 1082 compares the value of this PCR with the STC count value of the STC counter 1086 that will be described later, calculates a difference value, and outputs the difference value to the selector 1083 and the clock controller 1081. The clock controller 1081 stores in the internal memory the difference value obtained by the comparator 1082, or calculates an average for the difference values and stores the average. The difference value obtained by the comparator 1082 is also called PCR difference information or first clock control information, and the difference value obtained by the comparator 1082 and stored by the clock controller 1081, or the average value for difference values, is also called clock control information or second clock control information. In accordance with an instruction issued by the controller 114, the clock controller 1081 outputs the clock control information to the selector 1083.

The selector 1083 performs two-input and one-output selection in accordance with an instruction issued by the controller 114. That is, the selector 1083 accepts two entries from the comparator 1082 and the clock controller 1081, and outputs one signal to the LPF 1084. The process performed by the controller 114 to change the selection of the selector 1083 will be described later while referring to FIGS. 5 and 6. The LPF 1084 smoothes a signal by removing a high frequency element from the signal received from the selector 1083, and outputs the resultant signal to the VCXO 1085. Based on the signal that the LPF 1084 has smoothed by removing the high frequency element, the VCXO 1085 generates a clock for which an oscillation frequency is controlled, and outputs the clock to the STC counter 1086 and blocks, other than the clock reproduction unit 108, that require the clock.

The STC counter 1086 employs, as the initial value, the PCR value received from the separation/extraction unit 103, and is operated based on a block generated by the VCXO 1085. The count value is output to the comparator 1082 and the decoder 105.

With the arrangement shown in FIG. 2, the clock reproduction unit 108 employs a PLL (Phase Lock Loop) configuration when the selector 1083 selects a signal from the comparator 1082, and can reproduce a clock by employing the PCR that is transmitted by the separation/extraction unit 103. The operating mode for generating a clock using the PCR difference value received from the comparator 1082 is called a PCR mode or a first clock control mode. On the other hand, when the selector 1083 selects a signal received from the clock controller 1081, a clock can be generated based on clock control information stored in the clock controller 1081. The operating mode for generating a clock using the clock control information stored in the clock controller 1081 is called a clock control mode or a second clock control mode.

Since the clock controller 1081 generates and records clock control information during a period in which a digital broadcast can be normally received, a clock is generated, based on clock control information, having an accuracy that is near that of the frequency of the system clock of the encoding/multiplexing unit of the broadcast station.

The clock controller 1081 monitors a difference value between the PCR value obtained by the comparator 1082 and the STC count value held by the STC counter 1086. When the clock controller 1081 determines that a jitter is present in the PCR, or the PCR is discontinuous, the clock controller 1081 transmits a notification to that effect to the controller 114. In this case, the processing for storing the difference value, or the processing for calculating the average value of difference values and storing the average value, is not performed.

Upon receiving a notification indicating that a jitter is present in the PCR or that the PCR is discontinuous, the controller 114 permits the clock controller 1081 to output, to the selector 1083, a difference value, or the average obtained for the difference values, that was stored in the clock controller 1081 before the notification was issued (the PCR was normal). Further, the controller 114 permits the selector 1083 to output to the LPF 1084 the entry received from the clock controller 1081.

Through this operation, even when a PCR jitter is has occurred, or a discontinuous PCR is present, a more stable and accurate system clock can be generated.

As a PCR jitter detection method, for example, the difference value obtained by the comparator 1082, or the average value for difference values, can be monitored, and when the value falls within a predesignated threshold value, it can be determined that there is no PCR jitter, or that a discontinuous PCR is not included, or when the value falls outside the threshold value, it can be determined that there is a PCR jitter, or that a discontinuous PCR is included.

As another available method for PCR jitter detection, a difference value between the value of a PCR and the value of a time stamp added to a transport packet where the PCR is multiplexed is compared for several transport packets, and whether an almost constant value has been obtained is determined. When, for example, the time stamp comparison/output unit 109, which will be described later, compares time stamps, this method is available by using a time stamp value that is added and a PCR value included in a transport packet. Further, for example, when the time stamp adding unit 110 is to add a time stamp, this method is also available using a time stamp value to be added and a PCR value to be included in a transport packet.

As a method for discontinuous PCR detection, a discontinuity indicator, which is standardized by MPEG2-TS, or a DIT (Discontinuity Information Table) can be detected and determined, for example, by the separation/extraction unit 103.

Next, the arrangement and the operation of the time stamp adding unit 110 will be described in detail while referring to FIG. 3.

Figure 3:
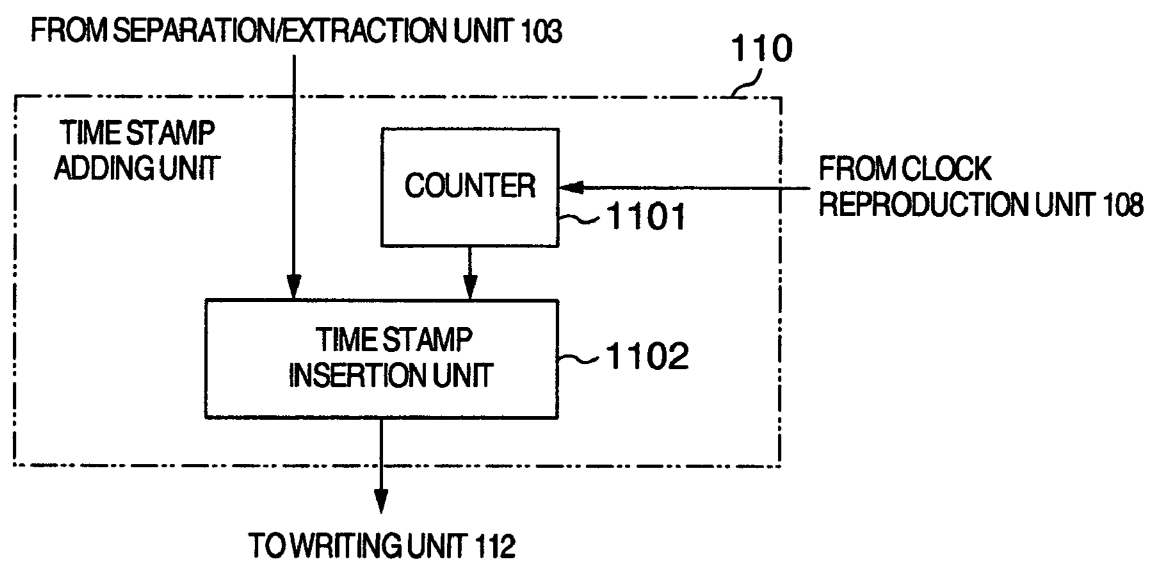
FIG. 3 is a block diagram illustrating an example arrangement of a time stamp adding unit.

In FIG. 3, the time stamp adding unit 110 includes a counter 1101 and a time stamp insertion unit 1102.

The counter 1101 is operated based on, for example, a system clock reproduced by the clock reproduced by the clock reproduction unit 108 in FIG. 1, or a clock generated by a quartz oscillator, and outputs the count value to the time stamp insertion unit 1102.

The time stamp insertion unit 1102 generates a time stamp based on the count value received from the counter 1101, and at the time at which a transport packet separated/extracted by the separation/extraction unit 103 is entered, adds (or embeds) a time stamp to the transport packet and outputs the transport packet to the writing unit 112. When a time stamp has already been provided for a transport packet that is separated/extracted by the separation/extraction unit 103, the time stamp insertion unit 1102, for example, determines that this is a fact, and outputs the transport packet to which the time stamp has been added, without performing the time stamp adding process.

The counter 1102 may obtain a PCR extracted by the separation/extraction unit 103 in FIG. 1, and then be operated while the PCR value is being used as the initial value.

The arrangement and the operation of the time stamp comparison/output unit 109 will now be described in detail while referring to FIG. 4.

Figure 4:
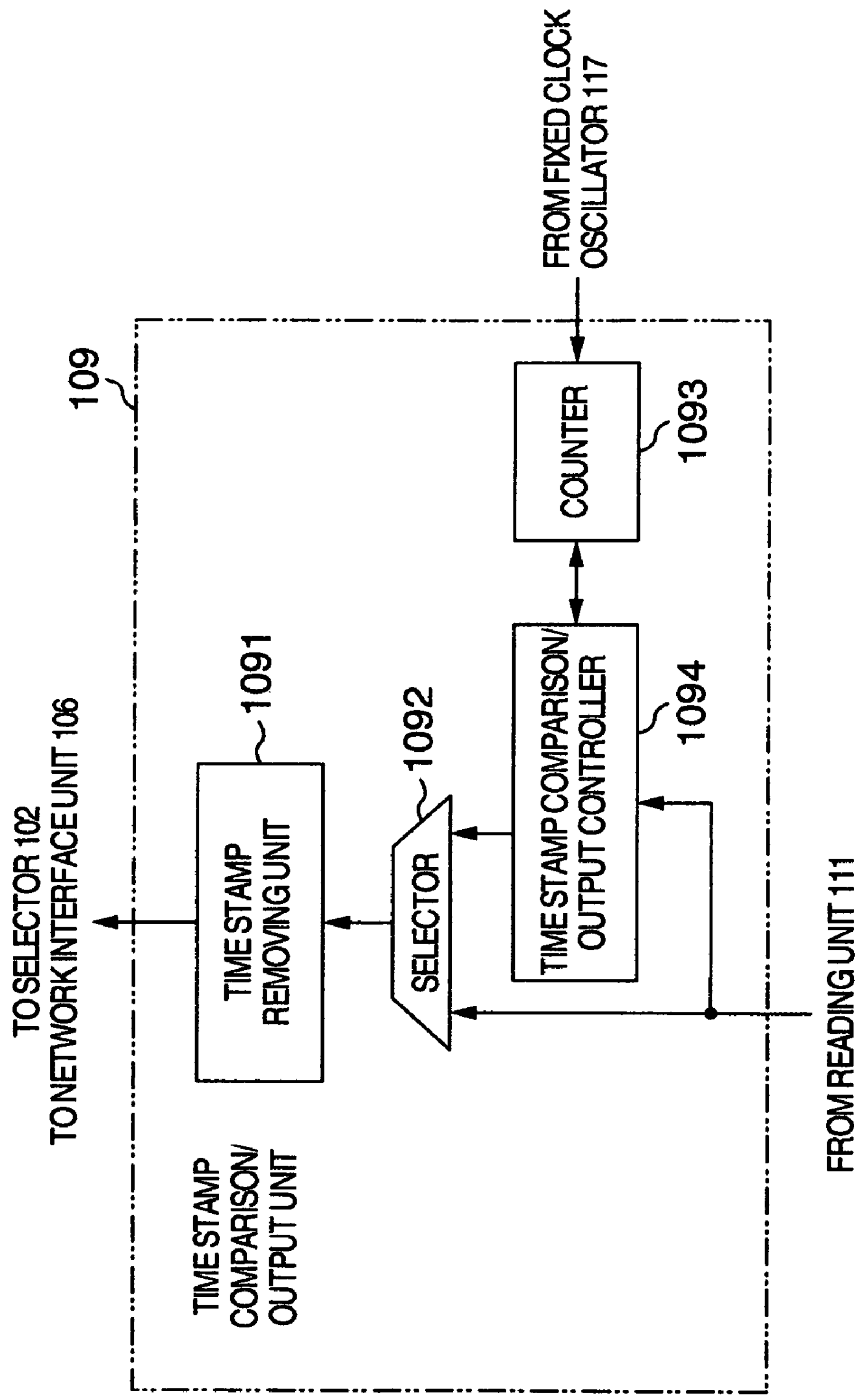
FIG. 4 is a block diagram illustrating an example arrangement of a time stamp comparison/output unit.

In FIG. 4, the time stamp comparison/output unit 109 includes a time stamp deletion unit 1091, a selector 1092, a counter 1093 and a time stamp comparison/output controller 1094.

The time stamp comparison/output controller 1094 obtains the time stamp value of a transport packet, read by the reading unit 111, to which the time stamp has been added, and outputs the time stamp value to the counter 1093.

The counter 1093 employs, as the initial value, the time stamp value that is obtained by the time stamp comparison/output controller 1094 in FIG. 4, and is operated based, for example, on a clock generated by the fixed clock oscillator 117, or on a clock generated by a quartz oscillator. Referring to FIGS. 1 and 4 of this embodiment, the counter 1093 is operated based on a clock generated by the fixed clock oscillator 117. The counter 1093 outputs the count value to the time stamp comparison/output controller 1094.

The time stamp comparison/output controller 1094 compares the count value for the counter 1093 with the time stamp that is added to a transport packet that has been read by the reading unit 111. When the count value and the time stamp value match, the transport packet, with this time stamp added, is output to the selector 1092.

The selector 1092 performs two-input and one-output selection in accordance with an instruction issued by the controller 114. Specifically, the selector 1092 outputs, to the time stamp deletion unit 1091, either a transport packet having a time stamp that is controlled timewise by the time stamp comparison/output controller 1094, or a transport packet having a time stamp that is transmitted by the reading unit 111. The controller 114 determines which of the transport packets should be selected by the selector 1092 (which will be described later while referring to FIG. 5). In FIG. 4, instead of the selector 1092, a switch may be arranged in front of the time stamp comparison/output unit 1094, and the entry of a transport packet obtained by the reading unit 111 may be switched between the time stamp comparison/output controller 1094 and the time stamp deletion unit 1091. The same effects can be obtained with this arrangement.

When the transport packet transmitted by the reading unit 111 is to be entered directly to the time stamp deletion unit 1091 (via the selector 1902), the buffer management unit 107 employs the results by monitoring the quantity of transport packets that have not been processed in the input buffer 104, and adjusts the quantity of transport packets read by the reading unit 111.

The time stamp deletion unit 1091 deletes (removes) a time stamp that has been added to a transport packet that is received from the selector 1092, and outputs the resultant transport packet to the selector 102 and/or the network interface unit 106.

The data structure of the digital broadcast reception device is shown in FIG. 7.

In a part (a) of FIG. 7, MPEG2-TS is shown, which is transmitted by the tuner decoder 101 of the digital broadcast reception device, via the selector 102, to the separation/extraction unit 103. For the MPEG-TS employed for digital broadcasting, multiple transport packets of a predetermined number of bytes (e.g., 188 bytes) are multiplexed. Each transport packet is formed of a transport header (hereinafter referred to as a TS header), a payload and an adaptation field. That is, the MPEG2-TS includes a series of transport packets corresponding to video signals, such as a digital video source.

The MPEG2-TS can be transmitted by multiplexing a plurality of sets of data, such as video data and audio data. A field is provided in the TS header for storing a PID (Packet Identification) used for identifying the payload or the adaptation field of a transport packet. For the reproduction of a digital signal, first, payloads having the same PID as those stored in the fields are coupled together, and desired data are extracted and are reproduced. For example, when payloads having the same PIDs are coupled together, a PES packet is obtained.

A program time standard reference value called a PCR is added to the adaptation field of the MPEG2-TS, so that video data and audio data can be reproduced at a timing intended by a broadcasting source, such as a broadcast station, and an overflow or an underflow will not occur in the input buffer (the STD buffer or the buffer 104) of the receiver. Furthermore, the PES additionally includes time management information called PTS, which is used for video display and audio reproduction, and time management information called DTS, which is used for video decoding.

The PCR is information used to correct (adjust or revise) time (timing) on the reception side or the reproduction side, relative to the reference time at the broadcast station, and is embedded in the MPEG2-TS to be output. The PTS and DTS are data that indicate a display/reproduction timing and a decoding timing, respectively, and are embedded in the PES header to be transmitted. In the above described MPEG2-TS, for example, a transport packet for program content (channel) A and a transport packet for program content (channel) B are alternately arranged.

The data structure shown in a part (b) of FIG. 7 is for a case wherein, upon receiving the MPEG2-TS shown in the part (a), the separation/extraction unit 103 selects the transport packet for program content (channel) A, and outputs this transport packet to the time stamp adding unit 110. When the MPEG2-TS that includes a plurality of transport packets is to be received, a transport packet for specific program content (channel) A is received, and upon the elapse of a packet internal (i.e., an empty time length) equivalent to a transport packet for program content (channel) B that is removed instead of being extracted, the succeeding transport packet for the program content (channel) A is received.

For example, an arbitrary time stamp can be added to the transport packet for the program content (channel) A, so long as a packet interval between the transport packets for the program content (channel) A can be obtained. For example, the time stamp may indicate the time at which the time stamp adding unit 110 received the transport packet for the program content (channel) A, or may indicate a time difference for the time extending from the reception by the time stamp adding unit 110 of the transport packet for the program content (channel) A (or a transport packet for predetermined program content (channel) A that was previously received) until the reception of the succeeding transport port for the program content (channel) A.

The data structure for the recording medium 113 in a part (c) of FIG. 7 is shown for a case wherein the individual transport packets in the stream shown in the part (b) are stored, with time stamps provided, on the recording medium 113. When a plurality of transport packets for which time stamps have been provided are stored on the recording medium 113, the physical interval disappears between a specific transport packet to which a time stamp is added and a succeeding transport packet to which a time stamp is added. This interval can be identified based on information that is indicated by a time stamp that is added to a transport packet that is read, by the time stamp comparison/output unit 109, via the reading unit 111.

In this embodiment, a time stamp having a predetermined data length is added to a transport packet in the part (b) of FIG. 7. As a result, the data size of a transport packet that includes the time stamp is increased so that it is greater than the transport packet itself. However, the time stamp need not always be added to the transport packet, and may be provided in any form, so long as it is correlated with the transport packet. For example, a special time stamp may be embedded in a predetermined or arbitrary empty field in a transport packet.

The operation (processing) of the controller 114 will now be described in detail while referring to FIG. 5. Here, the operation for controlling the buffer management unit 107, the clock reproduction unit 108 and the time stamp comparison/output unit 109 will in particular be described.

In FIG. 5, at S501, the control by the controller 114 is initiated. Either a predetermined timing, or a constant timing may be employed as the trigger for the start.

At S502, whether the PCR is normal is determined. As described above, this determination is performed based on when the clock reproduction unit 108 monitors a PCR and detects a PCR jitter. However, the PCR determination process is not limited to this method, and may be performed based on the detection of a PCR abnormality at another location. Further, the determination process may also be performed based on the detection of a PCR abnormality using a different method.

When it is determined at S502 that the PCR is normal (Yes at S502 in FIG. 5), program control is shifted to S504 and the processing is terminated. When it is determined at S502 that the PCR is not normal (No at S502 in FIG. 5), program control advances to S503.

At S503, the switching process is performed as the first control, so that the selector 1083 of the clock reproduction unit 108 outputs, to the LPF 1084, clock control information received from the clock controller 1081. Through this process, the clock reproduction unit 108 can reproduce a system clock based on the clock control information that was recorded when the PCR was normal.

Furthermore, at S503, the switching process is performed as the second control, so that the selector 1092 of the time stamp comparison/output unit 109 outputs, directly to the time stamp deletion unit 1091, the transport packet received from the reading unit 111. As the third control following this second control, the buffer management unit 107 monitors the quantity of the transport packets stored in the input buffer 104, and in accordance with the quantity, begins to control the reading starting and halting of the reading unit 111. Since a PCR abnormality may be caused by a time stamp abnormality, in this case, the output of transport packets is changed to the output only of those that do not include a time stamp. Thus, an overflow and an underflow of the buffer that occurs due to an the abnormality of the time stamp and/or the PCR can be prevented, and the content can be reproduced. It should be noted that the first control, the second control and the third control need not always be performed in this order, and may be performed substantially at the same time, or may be performed in a different order.

As described above, since the controller 114 performs the above described switching control, for the clock reproduction unit 108, in accordance with a PCR abnormality, an accurate system clock can be reproduced, even when the PCR is abnormal. Therefore, when content data are to be recorded on the recording medium 113, a time stamp can be generated using a more accurate system clock. Therefore, the content data can be recorded on the recording medium 113 with a better time stamp provided. Further, since when the PCR is abnormal the controller 114 performs buffer management and selects the reproduction of content in the above described manner, the content for which the time stamp is abnormal can also be reproduced without causing an overflow or an underflow of the buffer.

Another example operation (processing) for the controller 114 will now be described in detail while referring to FIG. 6. A difference from the operation in FIG. 5 is that content that includes a partially abnormal PCR and/or time stamp is taken into account. For example, assume that content is being recorded on the recording medium 113, or a different device is recording content on a recording medium, and that the condition for the reception of a broadcasting wave has temporarily been deteriorated. In this case, it is predicted that the PCR is abnormal for the portion of the content that is recorded in a period during which the reception condition has been deteriorated, and is normal for the other portion. For this determination, simply the controller 114 periodically examines the PCR to determine whether an abnormality is present.

Figure 6:
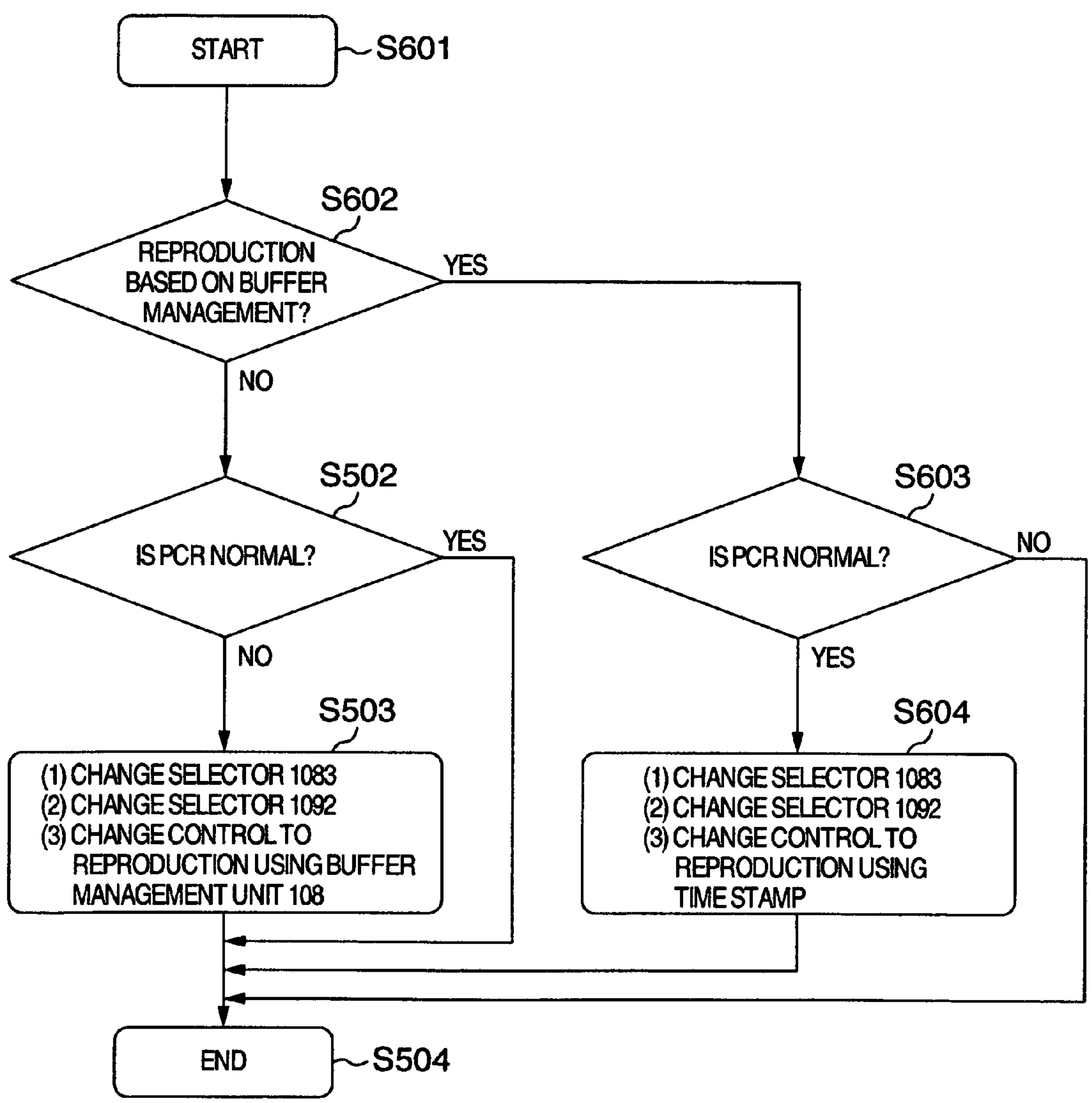
FIG. 6 is a flowchart showing an example operation (2) of the controller.

In FIG. 6, at S601, the controller 114 initiates the control process. Either a predetermined timing, or a constant timing may be employed as the trigger for the start.

At S602, whether the buffer management unit 107 is currently performing buffer management is determined. That is, a check is performed to determine whether reproduction based on a time stamp is being performed, or whether reproduction is being performed in accordance with the buffer management because of a PCR abnormality. This decision is made, for example, by determining whether the buffer management unit 107 is currently being operated. However, another determination method may be employed. When it is determined that the buffer management is not currently being performed (case of No, i.e., normal reproduction is currently being performed based on a time stamp), program control advances to S502. When it is determined that buffer management is currently being performed (case of Yes, i.e., reproduction is currently being performed in accordance with buffer management because of the PCR abnormality), program control is shifted to S603.

The processes at S502, S503 and S504 are the same as those in FIG. 5.

At S603, whether the PCR is normal is determined. When it is determined that the PCR is abnormal, program control is shifted to S504 in order to continue reproduction in accordance with the buffer management, and the processing is terminated. When it is determined at S603 that the PCR is normal, program control advances to S604. At S604, the switching process is performed as the first control process, i.e., the selector 1083 of the clock reproduction unit 108 outputs to the LPF 1084 a difference value received from the comparator 1082. Through this control, the clock reproduction unit 108 can employ the normal PCR and reproduce a system clock as intended by the broadcast station.

Further, at S604, the switching control is performed as the second control, i.e., the selector 1092 of the time stamp comparison/output unit 109 outputs to the time stamp deleting unit 1091 a transport packet received from the time stamp comparison/output controller 1904. As the third control following the second control, the buffer monitoring unit 107 monitors the quantity of transport packets in the input buffer 104, and in accordance with the quantity, terminates control of the starting and halting of the reading by reading unit 111. In this manner, the reproduction of content based on the time stamp can be performed.

It should be noted that the first control, the second control and the third control processes need not always be performed in this order, and may be performed almost at the same time, or may be performed in a different order. However, the second control and the third controls should be cooperative, so that the volume of the buffer is monitored during part of the second control process, and the second control is started based on this monitoring. That is, it is preferable that the second control process be started when a small quantity of transport packets that have not been processed by the decoder is present in the input buffer 104. This is because it is assumed that reproduction based on the time stamp (in a narrow sense, reproduction is defined as reading to the buffer) is performed when the input buffer is empty. Therefore, when the reproduction of content based on a time stamp is started while, for example, the volume of the input buffer 104 is large, transport packets are read to the input buffer 104 in the same manner as when the input buffer 104 is empty, regardless of the buffer volume. Then, an overflow of the buffer, for example, would occur. Thus, as described above, the buffer volume of the input buffer 104 is monitored, and when the buffer volume is small, the reproduction operation is switched to the reproduction of content based on a time stamp. Then, the occurrence of an overflow in the succeeding process can be reduced. The switching timing at which the buffer volume is small may be a timing at which the buffer management unit 107 employs the reading unit 111 to start reading, or another timing (a threshold) differing from this timing may be provided. The minimum buffer volume value may be employed for this timing and the threshold; however, the timing or the threshold is not limited to this value, and may be designated as a predetermined period, ratio or volume, in accordance with the buffer capacity of the input buffer 104 and a time stamp interval that does not cause an overflow, and the quantity of data to be read for each time stamp.

In addition, the second and the third control processes may not be performed, and only the first control may be performed to continue reproduction based on buffer management. This is because it is necessary to prevent an abnormality of the buffer, such as an overflow, that might occur, as described above, after the operation has been changed to the reproduction of content based on a time stamp. When the reproduction of content is halted by the user, the input buffer 104 becomes empty (or is emptied). Therefore, the second and third control processes may be performed, and after the reproduction halt has been canceled, reproduction based on a time stamp may be performed.

As for content when it is determined that the PCR is abnormal, information indicating that the PCR of the content is abnormal and the location in the PCR of the content where the abnormality is present may be recorded on the recording medium 113 or in the memory. At the next reproduction time, the content may be reproduced based on the buffer management, instead of using the time stamp.

According to the digital broadcast reception device on which the recording/reproducing device having the above arrangement is mounted, reproduction and/recording is enabled based on a clock that is generated using a PCR more accurately. Further, even for reproduction of the MPEG2-TS that includes a PCR jitter or a discontinuous PCR, or that has an abnormal time stamp, the occurrence of an overflow or an underflow can be prevented for the buffer that is arranged in the front stage of the decoder. As a result, the reproduction of content is enabled with reduced image deterioration, such as the occurrence of block noise in an image output by the decoder, or the freezing of an output image. Further, even when the MPEG2-TS includes a PCR jitter, or a discontinuous PCR, the reproduction and/or recording of content is enabled based on a system clock that is as accurate as a system clock generated based on a normal PCR.

The recording medium 113 in FIG. 1 has been incorporated in the digital broadcast reception device. However, the recording medium 113 may be a removable recording medium that conforms to the iVDR (Information Versatile Disk for Removable usage) or the Blu-ray Disc or the HD DVD standard. Since this removable recording medium may be employed by an unspecified large number of devices, some devices might record content without exactly recording a PCR and/or a time stamp. When the technical idea of this invention is employed, appropriate reproduction can still be performed for content that does not include the normal PCR and/or the normal time stamp. It should be noted that when a removable recording medium is employed the connector for the removable recording medium must be provided, instead of the recording medium 113. Further, a plurality of recording media or connectors for removable recording media may also be provided.

According to the arrangement of this embodiment, when an abnormality is present in the PCR, reproduction using the PCR is changed to reproduction based on buffer management. However, reproduction using a PCR may be changed to another method that does not employ an abnormal PCR.

Furthermore, in the embodiment, in order to determine whether a PCR is normal or abnormal, a predetermined condition for the PCR being normal may be predesignated, and it may be determined that the PCR is normal when the PCR falls within the predetermined condition, or that the PCR is abnormal when the PCR falls outside the predetermined condition. That is, it may be determined that a PCR falling within the predetermined condition is normal, and a PCR falling outside the predetermined condition is abnormal. The predetermined condition may be predesignated by the device, or may be appropriately designated by a user. Further, a predetermined condition for considering a PCR abnormal may be predesignated, and it may be determined that a PCR is abnormal when the PCR falls within the predetermined condition, or that the PCR is normal when the PCR falls outside the predetermined condition.

Second Embodiment

A second embodiment of the present invention will now be described while referring to FIG. 8.

A difference from the first embodiment is that a second clock reproduction unit 206, which will be described later, is employed instead of the fixed clock oscillator 117 for the first embodiment.

When a user desires to perform both the recording of broadcasting content and the viewing of other broadcasting content at the same time (i.e., the so-called recording of a program in the same time slot on a different channel), a plurality of tuners and separation/extraction units are required. In this embodiment, the arrangement shown in FIG. 8 is employed to enable the so-called recording of a program in the same time slot on a different channel. In FIG. 8, the digital broadcast reception device includes: a reproduction unit 20, a second tuner decoder 201, a second separation/extraction unit 202, a second input buffer 203, a second decoder 204, a second output unit 205 and a second clock reproduction unit 206. The structures of a recording/reproduction unit 10 and the internal units 101 to 116 are the same as those for the first embodiment. With this arrangement, while the recording/reproduction unit 10 is recording content, other content can be viewed using the reproduction unit 20. It should be noted that the controller 114 is connected via a bus to the individual sections (including the recording/reproduction unit 10 and the reproduction unit 20) of the digital broadcasting reception device, and controls the operation of the entire digital broadcasting reception device. Furthermore, the controller 114 receives various instruction signals from a user via the remote controller of the user interface unit 115, and based on the instruction signals, controls the sections connected via the bus, so that various processes can be performed.

This embodiment will be described in detail using FIG. 8. The second tuner decoder 201 receives a digital broadcast signal from a broadcast station via a broadcasting network, such as is provided by a broadcast satellite, a groundwave or a communication cable. The second tuner decoder 201 performs a tuning and detection process for the frequency of a physical or virtual channel that is designated via the user console unit of the remote controller of the user interface unit 115 and via the controller 114. Further, the second tuner decoder 201 outputs, to the second separation/extraction unit 202, MPEG2-TS, for which digital demodulation and error correction have been performed.

The second separation/extraction unit 202 separates/extracts, from the received MPEG2-TS, a transport packet for a channel (program) that is designated via the user console unit of the remote controller of the user interface unit 115 and via the controller 114, and then separates/extracts a video and an audio PES or ES from the transport packet and outputs the video and audio PES or ES to the second input buffer 203. In addition, the second separation/extraction unit 202 extracts a PCR from a transport packet for a channel (program) that is designated via the user console unit of the remote controller of the user interface unit 115 and via the controller 114, and outputs the extracted PCR to the second clock reproduction unit 206.

The second input buffer 203 temporarily stores the video and/or audio PES or ES received from the second separation/extraction unit 202. The second decoder 204 compares a DTS and/or a PTS, which corresponds to the PES or ES stored in the second input buffer 203, with an STC count value that is received from the second clock reproduction unit 206, and obtains a decoding/display timing. Then, at this timing, the second decoder 204 extracts and decodes the video and/or audio PES or ES, stored in the input buffer 104, and outputs the decoded video and/or audio data to the second output unit 205, and the second output unit 205 plays the decoded video and/audio data using a display unit and/or an audio output unit, which is an output device. Either this, or the second output unit 205 outputs content data via the output terminal to another display device. The same structure as the clock reproduction unit 108 in FIG. 1 may be employed as the detailed structure for the second clock reproduction unit 206. When the same arrangement as the clock reproduction unit 108 is employed, upon the occurrence of the abnormal PCR included in received content, a system clock can be more stably and accurately generated, in the same manner as described while referring to FIG. 2.

A difference in the operation of the recording/reproduction unit 10 from that of the first embodiment is that, as shown in FIG. 8, the time stamp comparison/output unit 109 is operated based on a system time clock transmitted by the second clock reproduction unit 206. Since the second reproduction unit 206 generates a clock using a PCR that is extracted from content received by the tuner decoder 201, an abnormality does not occur in the PCR due to the abnormality of a time stamp. Thus, a more accurate clock can be generated. Further, when an abnormality is present in the PCR of received content, as described above, an accurate system clock can be generated more stably. The other operation is performed in the same manner as in the first embodiment.

According to the above described arrangement, a system clock can be supplied to the time stamp comparison/output unit 109, without the fixed clock oscillator 117 in FIG. 1 being required. Thus, the cost for the fixed clock oscillator 107 can be reduced.

In the arrangement for this embodiment, the reproduction unit 20 does not record received content; however, the arrangement for the recording/reproduction unit 10 may also be employed for the reproduction unit 20. By using this configuration, a plurality of contents that are broadcast in the same time slot can be recorded. Furthermore, in this embodiment, two tuners have been provided; however, three or more tuners may be provided. In addition, the output unit 116 and the output unit 205 may be integrally formed as a single output unit.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A reproducing device comprising:

a reading unit for reading from a recording medium, based on a time stamp representing a timing for reading from the recording medium, a digital signal pre-recorded in a local recording medium, the digital signal including content data, a program time standard reference value, used for correction of a system clock, and the time stamp;

a decoder for decoding the content data included in the digital signal read by the reading unit; and a controller for permitting the reading unit, when the program time standard reference value falls outside a predetermined condition, to change from the reading of a digital signal that is based on the use of a time stamp, to the reading of a digital signal that is not based on use of a time stamp.

2. A reproducing device comprising:

a clock reproduction unit for generating a system clock;

a reading unit for reading, from a recording medium, a digital signal pre-recorded in a local recording medium, the digital signal including video data, audio data, a program time standard reference value that is used for correction of a system clock and a time stamp indicating a timing for reading data from a recording medium;

a time stamp comparison/output unit for receiving the digital signal read by the reading unit, comparing the time stamp with a count value that is based on a system clock generated by the clock reproduction unit, and outputting the digital signal;

a separation unit for separating the digital signal output by the time stamp comparison/output unit;

a buffer unit for temporarily storing the video data and the audio data that are included in the digital signal separated by the separation unit;

a decoder for decoding the video data and audio data stored in the buffer unit;

a buffer management unit for employing the quantities of video data and audio data stored in the buffer unit to manage the reading of a digital signal by the reading unit; and a controller for permitting, when the program time standard reference value falls outside a predetermined condition, the time stamp comparison/output unit to output the digital signal read by the reading unit, without a comparison of the count value and the time stamp being made, and for permitting the buffer management unit to control the reading of a digital signal by the reading unit in accordance with the quantities of video data and audio data stored in the buffer unit.

3. A reproducing device according to claim 2, wherein:

the time stamp comparison/output unit includes a counter to be operated based on a clock generated by the clock reproduction unit, a time stamp comparison/output controller for comparing a time stamp, provided for a digital broadcast signal received from the reading unit, with a count value output by the counter, and for outputting the digital broadcast signal based on the comparison result, a selector for receiving a first digital broadcasting signal from the reading unit and receiving a second digital broadcast signal from the time stamp comparison/output controller, and for outputting either the first or the second digital broadcast signal, and a time stamp deletion unit for deleting a time stamp that is added to the digital broadcast signal output by the selector; and when the program time standard reference value falls outside the predetermined condition, the controller changes the output of the selector from the second digital broadcast signal to the first digital broadcast signal.

4. A reproducing device according to claim 2, wherein:

the reading unit includes a counter to be operated based on a system clock;

a time stamp comparison/output controller for comparing a time stamp, provided for a digital broadcast signal read from the recording medium, with a count value output by the counter, and for outputting the digital broadcast signal, a selector for receiving a first digital broadcasting signal from the recording medium and receiving a second digital broadcast signal from the time stamp comparison/output controller, and for outputting either the first or the second digital broadcast signal, and a time stamp deletion unit for deleting a time stamp that is added to the digital broadcast signal output by the selector; and when the program time standard reference value falls outside the predetermined condition, the controller changes the output of the selector from the second digital broadcast signal to the first digital broadcast signal.

5. A reproducing device according to claim 2, wherein, when the program time standard reference value is changed from outside the predetermined condition to within the predetermined condition, the controller changes a reproduction mode, so that the reading unit outputs the digital broadcast signal based on the time stamp.

6. A reproducing device according to claim 2, wherein, when the program time standard reference value is changed from outside the predetermined condition to within the predetermined condition, the controller changes a reproduction mode, so that the time stamp comparison/output unit compares, with the time stamp added to the digital broadcast signal, a count value that is based on a clock generated by the clock reproduction unit and outputs the digital broadcast signal based on the comparison result, and the buffer management unit terminates management of the reading of a digital signal by the reading unit.

7. A reproducing device according to claim 3, wherein, when the program time standard reference value is changed from outside the predetermined condition to within the predetermined condition, the output of the selector is changed from the first digital broadcast signal to the second broadcast signal.

8. A reproducing device according to claim 1, wherein the predetermined condition is falling within a range wherein a difference value, between a value of the time stamp and the program time standard reference value, or the average value of the difference value, is predesignated.

9. A reproducing method for reproducing content data comprising the steps of:
- reading a digital signal pre-recorded in a local recording medium, the digital signal including content data, a program time standard reference value used for generation of a system clock, and a time stamp indicating a timing for reading data from a recording medium; and
- when the program time standard reference value that falls outside a predetermined condition is entered, changing reading of the digital signal using the time stamp to read the digital signal without using the time stamp.

10. A reproducing method according to claim 9, wherein the reading of the digital signal without using the time stamp indicates the reading of the digital signal through the management of a buffer unit wherein the digital signal is temporarily stored.

11. A reproducing method according to claim 9, wherein the predetermined condition is falling within a range wherein a difference value, between a value of the time stamp and the program time standard reference value, or the average value of the difference value, is predesignated.

12. A recording device comprising:
- a receiver for receiving a digital signal that includes content data and a program time standard reference value for correcting a system clock;
- a clock reproduction unit for generating a corrected system clock using the program time standard reference value included in the digital signal received by the receiver;
- a time stamp adding unit for employing the system clock, generated by the clock reproduction unit, to add to the digital signal received by the receiver a time stamp representing a timing at which to perform reading from a recording medium;
- a recording unit for recording on a local recording medium the digital signal for which the time stamp has been provided by the time stamp adding unit; and
- a controller for when the program time standard reference value falls outside a predetermined condition, permitting the clock reproduction unit to generate a system clock without using the program time standard reference value that is outside the predetermined condition for recording the digital signal in the local recording medium.

13. A recording device comprising:
- a receiver for receiving a digital signal that includes video data, audio data and a program time standard reference value that is reference information for correcting a system clock;
- a separation unit for separating the digital signal received by the receiver;
- a clock reproduction unit for generating a system clock that is corrected using the program time standard reference value separated by the separation unit;
- a time stamp adding unit for employing a count value that is based on a system clock generated by the clock reproduction unit, and adding, to the digital signal separated by the separation unit, a time stamp indicating a timing to be read from a local recording medium;
- a recording unit for recording, on the local recording medium, the digital signal to which the time stamp has been added by the time stamp adding unit; and
- a controller for controlling the clock reproduction unit, wherein:

the clock reproduction unit includes
- an oscillator that is capable of adjusting a frequency,
- a first counter that is to be operated based on the program time standard reference value and a clock oscillated by the oscillator,
- a comparator for comparing the program time standard reference value with a first count value output by the first counter,
- a clock controller for recording a clock control value that is a comparison result obtained by the comparator when the program time standard reference value is within a predetermined condition,
- a first selector for receiving the comparison result from the comparator and receives the clock control value from the clock controller, and outputting either the comparison result or the clock control value, and
- a low pass filter for removing a high frequency element from the output of the first selector, and outputs a smoothed signal to the oscillator, and when the program time standard reference value falls outside the predetermined condition, the controller changes the output of the first selector from the comparison output to the clock control value for recording the digital signal in the local recording medium.

14. A recording device according to claim 12, wherein the clock reproduction unit includes
- an oscillator that is capable of adjusting a frequency,
- a first counter that is to be operated based on the program time standard reference value and a clock oscillated by the oscillator,
- a comparator for comparing the program time standard reference value with a first count value output by the first counter,
- a clock controller for recording a clock control value that is a comparison result obtained by the comparator when the program time standard reference value is within a predetermined condition,
- a first selector for receiving the comparison result from the comparator and receives the clock control value from the clock controller, and outputting either the comparison result or the clock control value, and a low-pass filter for removing a high frequency element from the output of the first selector, and outputs a smoothed signal to the oscillator; and wherein, when the program time standard reference value falls outside the predetermined condition, the controller changes the output of the first selector from the comparison output to the clock control value.

15. A recording device according to claim 13, wherein the comparison result obtained by the comparator is a difference value calculated by comparing the program time standard reference value and the first count value output by the first counter.

16. A recording device according to claim 12, wherein the predetermined condition is falling within a range wherein a difference value, between a value of the time stamp and the program time standard reference value, or the average value of the difference value, is predesignated.

* * * * *